United States Patent
Ho et al.

(12)

(10) Patent No.: US 6,307,541 B1
(45) Date of Patent: Oct. 23, 2001

(54) METHOD AND SYSTEM FOR INPUTTING CHINESE-CHARACTERS THROUGH VIRTUAL KEYBOARDS TO DATA PROCESSOR

(75) Inventors: Chi-Yu Ho, Taipei (TW); Chun Jiang; Chang Wang, both of Shanghai (CN)

(73) Assignee: Inventec Corporation (TW)

( * ) Notice: Subject to any disclaimer, the term of this patent is extended or adjusted under 35 U.S.C. 154(b) by 0 days.

(21) Appl. No.: 09/348,899

(22) Filed: Jul. 7, 1999

(30) Foreign Application Priority Data

Apr. 29, 1999 (TW) ................................. 88106921

(51) Int. Cl.[7] ........................... G09G 5/00; H03K 17/94; G06F 15/00; B41J 5/00
(52) U.S. Cl. ........................... 345/171; 341/28; 707/535; 400/110
(58) Field of Search ................................. 345/168, 169, 345/171, 172, 173, 467, 471; 341/20, 22, 28; 707/535; 700/83, 84; 708/142, 143, 144, 145, 146; 400/110

(56) References Cited

U.S. PATENT DOCUMENTS

| | | | |
|---|---|---|---|
| 4,333,097 | * 6/1982 | Buric et al. | 345/168 |
| 4,531,119 | * 7/1985 | Nakayama et al. | 345/171 |
| 4,872,196 | * 10/1989 | Royer et al. | 341/28 |
| 5,128,672 | * 7/1992 | Kaehler | 341/28 |
| 5,457,454 | * 10/1995 | Sugano | 341/22 |
| 6,005,498 | * 12/1999 | Yang et al. | 341/28 |
| 6,007,339 | * 12/1999 | Zen et al. | 345/171 |
| 6,009,444 | * 12/1999 | Chen | 707/535 |
| 6,046,732 | * 4/2000 | Nishimoto | 345/168 |
| 6,054,941 | * 4/2000 | Chen | 341/28 |
| 6,170,000 | * 1/2001 | Bories et al. | 707/535 |

FOREIGN PATENT DOCUMENTS

WO 98 47302
A  10/1998 (WO).
WO 99 34645  7/1999 (WO).

* cited by examiner

*Primary Examiner*—Steven Saras
*Assistant Examiner*—Paul A. Bell
(74) *Attorney, Agent, or Firm*—Peter F. Corless; Edwards & Angell, LLP

(57) ABSTRACT

A Chinese-character input method and system is provided to allow users to input Chinese characters to a data processor with a reduced keyboard, such as a mobile-phone handset with a CCITT-compliant (Consultative Committee in International Telegraphy and Telephony) keyboard having only 12 keys. This Chinese-character input method and system allows the user to input Chinese characters to the data processor through a plurality of virtual keyboards which collectively display a set of phonetic symbols, such as those in the Mandarin Phonetic Symbol Set or the Roman Symbol Set, so that the user can perform the input operation through a pronunciation-based input scheme. The Chinese-character input method and system arranges the virtual keyboards in relational layers in accordance with the Mandarin Phonetic-Symbol Combination Rules or the Chinese Roman-Symbol Combination Rules, so that the user can perform the task of Chinese-character input to the data processor more conveniently and efficiently than the prior art.

20 Claims, 5 Drawing Sheets

| Layer Number | Phonetic Symbols |
|---|---|
| Layer 1 | ㄅ、ㄆ、ㄇ、ㄈ、ㄉ、ㄊ、ㄋ、ㄌ、ㄍ、ㄎ、ㄏ、ㄐ、ㄑ、ㄒ、ㄞ、ㄠ、ㄢ、ㄓ、ㄔ、ㄕ、ㄗ、ㄘ、ㄙ、一、ㄨ、ㄩ、ㄖ、ㄜ... |
| Layer 2 | ...... |

METHOD AND SYSTEM FOR INPUTTING CHINESE-CHARACTERS THROUGH VIRTUAL KEYBOARDS TO DATA PROCESSOR

BACKGROUND OF THE INVENTION

1. Field of the Invention

This invention relates to data input technology, and more particularly, to a Chinese-character input method and system that allows users to input Chinese characters to a data processor with a reduced keyboard, such as a mobile-phone handset with a CCITT-compliant (Consultative Committee in International Telegraphy and Telephony) keyboard having only 12 keys. This invention allows the user to input Chinese characters to the data processor through a plurality of virtual keyboards which collectively display a set of phonetic symbols, such as those in the Mandarin Phonetic Symbol Set or the Roman Symbol Set, so that the user can perform the task of Chinese-character input through a pronunciation-based input scheme.

2. Description of Related Art

In this information age, electronic communication means, such as mobile phone and E-mail, have been replacing conventional mails for people to communicate with each other. The mobile phone, as a handy and convenient communication tool, is particularly rapidly expanding in the consumer market due to great demand from all walks of life. In Chinese-speaking areas, such as Taiwan, the sales in the past one year has exceeded the total of the past few years.

Conventional mobile-phone handsets only allow the user to perform speech communication. Newer models, in addition, allow the user to send E-mails and messages to the receiver. Since E-mail typically contains text, it is required to use the keyboard on the mobile-phone handset for text input. However, since a conventional mobile-phone handset is typically provided with a CCITT-compliant keyboard having 12 keys only, the text-input task is always laborious.

FIG. 1 is a front view of a conventional mobile-phone handset (designated by the reference numeral 100) that utilizes a CCITT-compliant keyboard (designated by the reference numeral 110). The mobile-phone handset 100 further includes a pair of control keys (SOFT) 121, 122; a shift key 123; and a 168×98 LCD (liquid crystal display) 130. The functions of the control keys 121, 122 and shift key 123 are well-known and not within the spirit and scope of the invention, so detailed description thereof will not be given in this specification. The CCITT-compliant keyboard 110 includes 12 keys: 1, 2ABC, 3DEF, 4GHI, 5JKL, 6MNO, 7PQR, 8TUV, 9WXY, *, 0, and #. The user can use these keys to input both numbers and English letters to the mobile-phone handset 100, 10 which can then transmit the input message through radio link to the receiving side. When a specific key on the CCITT-compliant keyboard 110 is pressed, the number and letters printed on that key will be activated in a cyclic manner.

When the user wants to input a certain number, he/she needs just to press the key that prints the intended number. For instance, when the user wants to input the number "3" to the mobile-phone handset 100, he/she needs just to press the 3DEF Key once.

On the other hand, when the user wants to input a certain English letter, he/she needs to repeatedly press the key that prints the intended letter for a specific number of times indicated by the order of that letter on the key. For instance, when the user wants to input the English letter "A", he/she needs to repeatedly press th 2ABC key twice; when the user wants to input the English letter "E", he/she needs to repeatedly press the 3DEF key for three times; and when the user wants to input the English letter "L", he/she needs to repeatedly press the 5JKL for four times.

In addition to numbers and English letters, the CCITT-compliant keyboard 110 can also be used to input special symbols to the mobile-phone handset 100 that are customized by the manufacturer. For instance, when the user wants to input the symbol ">", if provided, to the mobile-phone handset 100, he/she may need to press the * jey repeatedly for 10 times. Inputting symbols to the mobile-phone handset 100 in such a manner may be highly laborious and time-consuming, but for a 12-key keyboard, it would usually be considered acceptable However, it nevertheless makes some advanced computer functions, such as networking and E-mail, very difficult to achieve. Moreover, using the 12-key CCITT-compliant keyboard 110 for Chinese input is even more laborious and time-consuming, so that running Chinese-based applications on the mobile-phone handset 100 is still quite difficult.

One solution to the foregoing problem is to couple the mobile-phone handset with a PDA (Personal Digital Assistant) or the like, whereby the task of Chinese-character input can be performed through the PDA. This is achieved by displaying a virtual keyboard on the LCD of the mobile-phone handset, and the virtual keyboard displays a set of phonetic symbols, such as those in the Mandarin Phonetic Symbol Set or the Roman Symbol Set to allow the user to perform the task of Chinese-character input through a pronunciation-based input scheme. A certain key on the virtual keyboard can be activated by touching that key with hand or pen.

One drawback to the foregoing solution, however, is that the displayed virtual keyboard on the LCD is quite small in size due to the LCD itself being very small in size, which makes the touching of each individual key on the virtual keyboard quite difficult to be targeted precisely. In consequence, wrong keys can often be mistakenly selected.

Moreover, since the above-mentioned virtual keyboard is activated by the coupled PDA and not by the CCITT-compliant keyboard on the mobile-phone handset, it would make the use of the mobile-phone handset more inconvenient.

To find solutions to the above-mentioned drawbacks of the prior art, it is still a research effort in the industry to develop an easy-to-use Chinese-character input method and system that allows the user to perform the task of Chinese-character input to the mobile-phone handset more conveniently and efficiently through the CCITT-compliant keyboard.

SUMMARY OF THE INVENTION

It is therefore an objective of this invention to provide a novel Chinese-character input method and system for a data processor with a reduced keyboard, which allows the user to perform the task of Chinese-character input to the data processor more conveniently and efficiently.

It is another objective of this invention to provide a novel Chinese-character input method and system for mobile-phone handset, which allows the mobile-phone handset to be expanded in Chinese-based applications.

In accordance with the foregoing and other objectives of this invention, a new Chinese-character input method and system is provided for use on a data processor with a reduced keyboard.

The Chinese-character input method and system of the invention is characterized in the use of a plurality of virtual keyboards, which are arranged in relational layers and used collectively to display a set of phonetic symbols, such as those in the Mandarin Phonetic Symbol Set or the Roman Symbol Set. These virtual keyboards are arranged in relational layers in accordance with the Mandarin Phonetic-Symbol Combination Rules or the Chinese Roman-Symbol Combination Rules, so that the user can perform the task of Chiese-character input to the data processor more conveniently and efficiently than the prior art.

BRIEF DESCRIPTION OF DRAWINGS

The invention can be more fully understood by reading the following, detailed description of the preferred embodiments, with reference made to the accompanying drawings, wherein.

DETAILED DESCRIPTION OF PREFERRED EMBODIMENTS

The invention provides a Chinese-character input method and system that allows users to input Chinese characters to a data processor with a reduced keyboard, such as a mobile-phone handset with a CCITT-compliant keyboard having only 12 keys. In the following disclosure of preferred embodiments, the invention is specifically utilized on a mobile-phone handset; however, it is to be first understood that the invention is not limited to such an application, and instead can be utilized on any types of data processors that can process Chinese data. Moreover, in the following preferred embodiments, the Mandarin Phonetic Symbol Set and the Roman Symbol Set are used to code each Chinese character; however, it is to be understood that other symbol sets that are used to code Chinese characters are also covered within the scope of the invention.

Figure 2:
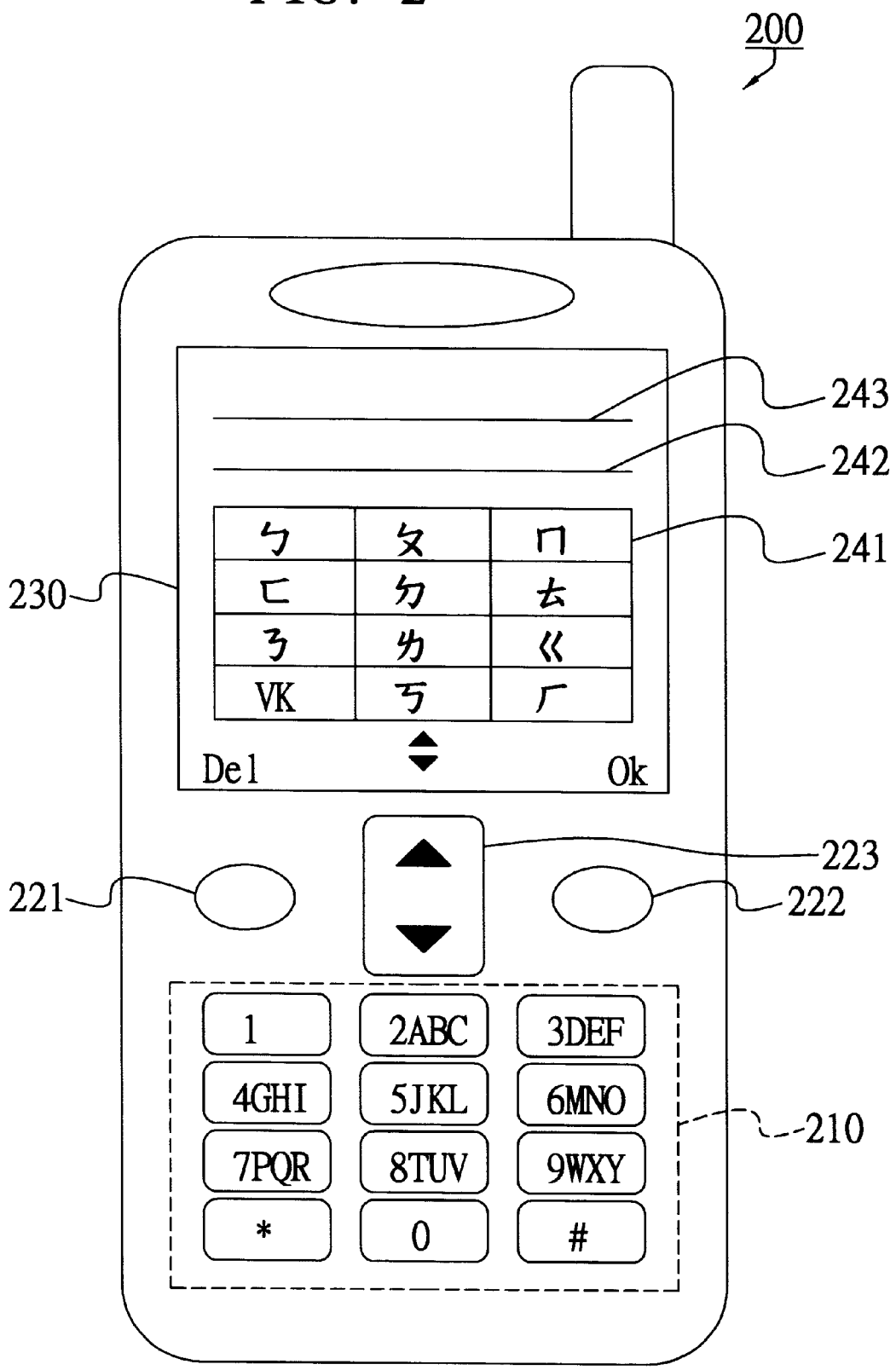
FIG. 2 is a front view of a mobile-phone handset on which the invention is provided to allow Chinese-character input through virtual keyboards.

FIG. 2 is a front view of a mobile-phone handset (here designated by the reference numeral 200) on which the invention is utilized. As shown, the mobile-phone handset 200 includes a CCITT-compliant keyboard 210, a pair of control keys (SOFT) 221, 222; a shift key 223; and a display screen, such as an LCD 230. The CCITT-compliant keyboard 210 includes 12 keys: [1], [2ABC], [3DEF], [4GHI], [5JKL], [6MNO], [7PQR], [8TUV], [9WXY], [*], [0], and [#].

Figure 1:
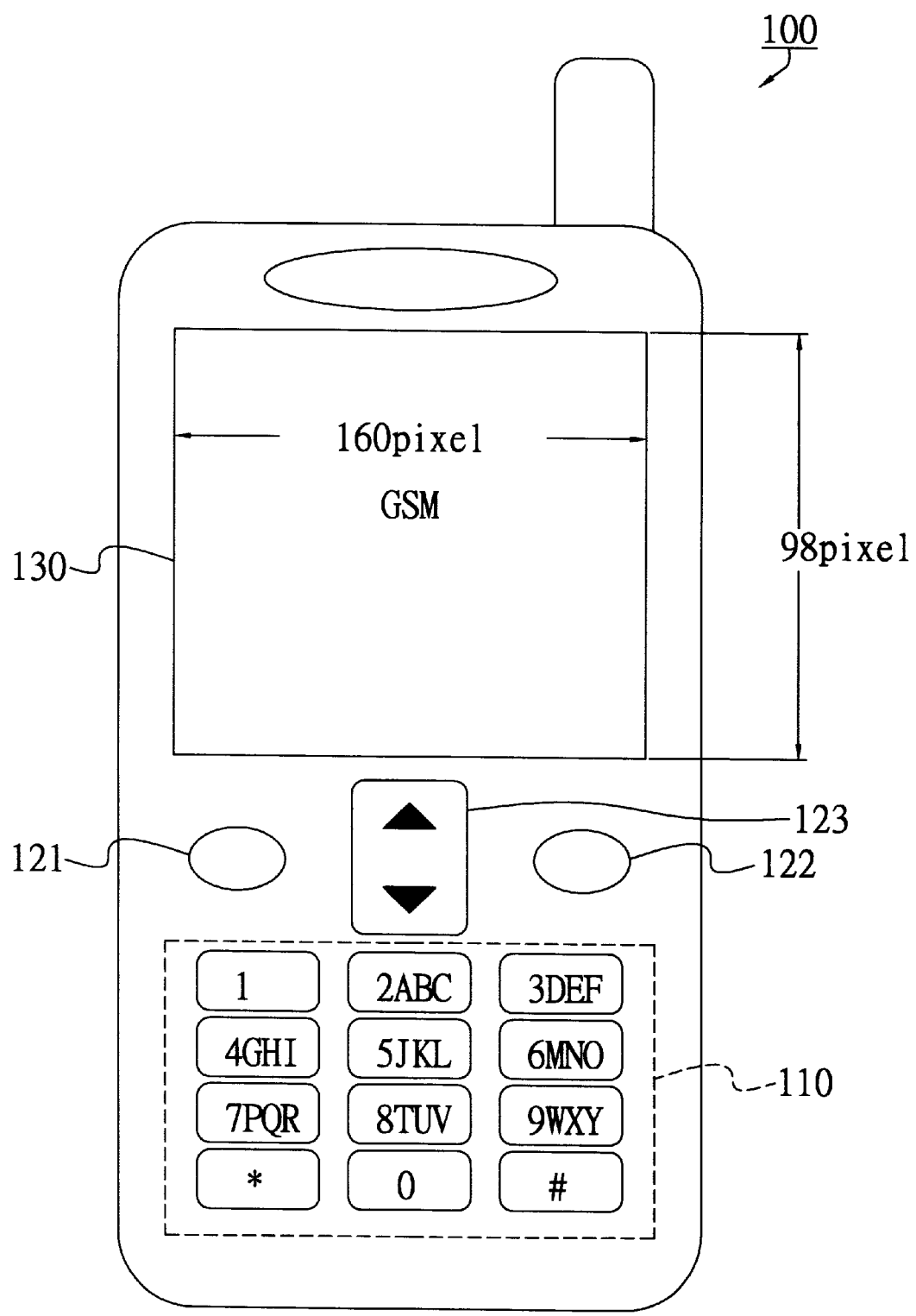
FIG. 1 is a front view of a conventional mobile-phone handset that utilizes a CCITT-compliant keyboard.

The mobile-phone handset 200 differs from the one shown in FIG. 1 in that this mobile-phone handset 200 provides a plurality of virtual keyboards, each having 12 virtual keys mapped in one-to-one correspondence to the 12 physical keys on the CCITT-compliant keyboard 210, as the one displayed on the LCD 230 and designated by the reference numeral 241. In addition, the LCD 230 includes a Chinese Phonetic Symbol Input Area 242 and a Chinese Editing Area 243. When the virtual keyboard 241 is displayed on the LCD 230, the user can select any key on the virtual keyboard 241 simply by pressing the corresponding physical key on the CCITT-compliant keyboard 210. The Chinese Phonetic Symbol Input Area 242 is used to display the currently-input phonetic symbol(s), while the Chinese Editing Area 243 is used to display the currently-input Chinese character(s).

Chinese input is more difficult than English input since Chinese characters are ideograms rather than alphabetic combinations. There are a great number of Chinese-character input schemes that have been proposed for Chinese input. The most commonly used Chinese-character input schemes include the use of Mandarin Phonetic Symbol Set or Roman Symbol Set to address the pronunciation of each Chinese character. Both of these sets include several dozens of symbols for representing the pronunciations of Chinese characters. Since the CCITT-compliant keyboard includes only 12 physical keys, it is impossible to display all the phonetic symbols thereof Therefore, it is an important aspect of the invention to provide a plurality of virtual keyboards to collectively display these phonetic symbols, which each virtual keyboard displaying only a specified part of these phonetic symbols. The user can manually switch between these virtual keyboards to the one that displays the required phonetic symbols. This practice, however, would make the input operation very laborious. It is therefore another important aspect of the invention to arrange these virtual keyboards in relational layers in accordance with some regularities in all the permissible phonetic-symbol combinations for Chinese characters, so that the user can perform the task of Chinese-character input to the data processor more conveniently and efficiently.

The following are two preferred embodiments of the invention, with the first preferred embodiment being directed to the use of the Mandarin Phonetic Symbol Set to address Chinese characters, and the second preferred embodiment being, directed to the use of the Roman Symbol Set to address Chinese characters.

1. Preferred Embodiment with the Mandarin Phonetic Symbol Set

The Mandarin Phonetic Symbol Set includes a set of 42 phonetic symbols representative of the consonants, vowels, and tones used for the representation of Chinese-character pronunciations. These phonetic symbols are shown in the following.

| Consonants & Vowels | | | | | | |
|---|---|---|---|---|---|---|
| ㄅ | ㄆ | ㄇ | ㄈ | ㄉ | ㄊ | ㄋ |
| ㄌ | ㄍ | ㄎ | ㄏ | ㄐ | ㄑ | ㄒ |
| ㄓ | ㄔ | ㄕ | ㄖ | ㄗ | ㄘ | ㄙ |
| ㄚ | ㄛ | ㄜ | ㄝ | ㄞ | ㄟ | ㄠ |
| ㄡ | ㄢ | ㄣ | ㄤ | ㄥ | ㄦ | ㄧ |
| ㄨ | ㄩ | | | | | |

| Tones | | | | |
|---|---|---|---|---|
| 1st Tone (陰平) | 2nd Tone (陽平) | 3rd Tone (上聲) | 4th Tone (去聲) | 5th Tone (輕聲) |
| - | / | v | \ | · |

Note that, for simplification of representation, the 5 tones will be symbolized on the virtual keyboards as numerals; i.e., the first tone is represented by "1"; the second tone is represented by "2"; the third tone is represented by "3"; the fourth tone is represented by "4"; and the fifth tone is represented by "5". Also, hereinafter throughout this specification, the tones will be also represented in this way in the representation of phonetic-symbol combinations. For example, the standard way of expressing the pronunciation of the Chinese character "票" with the Mandarin Phonetic Symbol Set is "ㄆㄧㄠˋ", but it will be expressed as "ㄆㄧㄠ4" in this specification for consistency with the symbols on the virtual keyboards.

Fundamentally, the pronunciation of a Chinese character can be represented by a consonant/vowel combination of one, two, or three phonetic symbols plus one tone. Therefore, each Chinese character can be represented by a combination of 1, 2, or 3 consonant/vowel symbols plus 1 tone symbol; in other words, a phonetic-symbol combination requires at least 2 phonetic symbols and at most 4 phonetic symbols. Generally, the following rules apply to the Chinese-character pronunciations:

[Pronunciation]=[Vowel]+[Tone]

[Pronunciation]=[Consonant]+[Vowel]+[Tone]

[Pronunciation]=[First-Stage Vowel]+[Second-Stage Vowel]+[Tone]

[Pronunciation]=[Consonant]+[First-Stage Vowel]+[Second-Stage Vowel]+[Tone]

Through induction, it can be found that there exist many regularities in the phonetic-symbol combinations using the Mandarin Phonetic Symbol Set. For instance, the phonetic symbol "ㄝ" unexceptionally follows behind another phonetic symbol, i.e., it will never be the first one in any phonetic-symbol combinations; and second-stage vowels come into existence only when the first-stage vowel is either of [ㄧ, ㄨ, ㄩ].

Moreover, the consonants [ㄐ, ㄑ, ㄒ] combine with vowels in accordance with the following rule:

[Pronunciation]=[ㄐ, ㄑ, ㄒ]+[ㄧ, ㄩ]+[Second-Stage Vowel]

which implies that when "ㄐ", "ㄑ", or "ㄒ" is the first phonetic symbol in a phonetic symbol combination, then the next phonetic symbol will be unexceptionally either "ㄧ" or "ㄩ".

The invention provides a plurality of virtual keyboards, each having 12 keys mapped in one-to-one correspondence to the 12 physical keys on the CCITT-compliant keyboard. These virtual keyboards are used collectively to display all the phonetic symbols in the Mandarin Phonetic Symbol Set for the user to perform the task of Chinese-character input based on the pronunciation of the intended Chinese character. As mentioned above, the Mandarin Phonetic Symbol Set includes 42 phonetic symbols for consonants, vowels, and tones; therefore, in order to allow the 12 physical keys on the CCITT-compliant keyboard to address these 42 phonetic symbols, it is an important aspect of the invention to use the above-mentioned regularities in the Chinese phonetic-symbol combinations to arrange the virtual keyboards in relational layers so that the input operation can be carried out in a more convenient and efficient manner.

The regularities in the Chinese phonetic-symbol combinations are summarized in the following and are herein and hereinafter collectively referred to as "Mandarin Phonetic-Symbol Combination Rules" throughout this specification.

Fundamentally, consonants combine with first-stage and second-stage vowels in accordance with the following rule:

[Pronunciation]=[Consonant]+[First-Stage Vowel±Exceptional Vowels]+[Second-Stage Vowel±Exceptional Vowels]

The consonants in the Mandarin Phonetic Symbol Set can be divided into the following 7 subsets:

Consonant Subset 1={ㄅ, ㄆ, ㄇ}

Consonant Subset 2={ㄉ, ㄊ, ㄋ, ㄌ}

Consonant Subset 3={ㄍ, ㄎ, ㄏ, ㄓ, ㄔ, ㄕ}

Consonant Subset 4={ㄖ, ㄗ, ㄘ, ㄙ}

Consonant Subset 5={ㄐ, ㄑ, ㄒ}

Consonant Subset 6={ㄈ}

Consonant Subset 7={0}, where {0} represents Zero-Consonant)

The consonants in these subsets combine with vowels in different ways, as respectively given in the following.

1-1. Consonant Subset {ㄅ, ㄆ, ㄇ}

Let

First-Stage Vowel Subset

A={ㄚ, ㄛ, ㄜ, ㄟ, ㄠ, ㄡ, ㄢ, ㄣ, ㄤ, ㄥ, ㄧ, ㄨ}

Second-Stage Vowel Subset

B={ㄝ, ㄠ, ㄢ, ㄣ, ㄥ|(if A=ㄧ)}

Phonetic-symbol combination rules:

[ㄅ]+[A-ㄡ]+(if A=ㄧ) [B]

[ㄆ]+[A]+(if A=ㄧ) [B]

[ㄇ]+[A+ㄝ]+(is A=ㄧ) [B+ㄡ]

1-2. Consonant Subset {ㄉ, ㄊ, ㄋ, ㄌ}

Let

First-Stage Vowel Subset

A={ㄚ, ㄜ, ㄞ, ㄠ, ㄡ, ㄢ, ㄤ, ㄥ, ㄧ, ㄨ, ㄩ}

Second-Stage Vowel Subsets

B1={ㄝ, ㄠ, ㄡ, ㄢ, ㄥ|(if A=ㄧ)}

B2={ㄛ, ㄢ, ㄣ, ㄥ|(if A=ㄨ)}

B3={ㄝ (if A=ㄩ)}

Phonetic-symbol combination rules:

[ㄉ]+[A—ㄩ]+(if A=ㄧ) [B1]

Or

[ㄉ]+[A—ㄩ]+(if A=ㄨ) [B2+ㄟ]

[ㄊ]+[A—ㄩ]+(if A=ㄧ) [B1-ㄠ]

Or

[ㄊ]+[A—ㄩ]+(if A=ㄨ) [B2+ㄟ]

[ㄋ]+[A+ㄟ+ㄣ]+(if A=ㄧ) [B1+ㄣ+ㄤ]

Or

[ㄋ]+[A+ㄟ+ㄣ]+(if A=ㄨ) [B2-ㄣ]

Or

[ㄋ]+[A+ㄟ+ㄣ]+(if A=ㄩ) [B3+ㄝ]

[ㄌ]+[A+ㄟ]+(if A=ㄧ) [B1+ㄣ+ㄤ]

Or

[ㄌ]+[A+ㄟ]+(if A=ㄨ) [B2]

Or

[ㄌ]+[A+ㄟ]+(if A=ㄩ) [B3+ㄝ]

1-3. Consonant Subset {ㄍ, ㄎ, ㄏ, ㄓ, ㄔ, ㄕ}
Let
   First-Stage Vowel Subset
   A={ㄚ, ㄛ, ㄞ, ㄠ, ㄡ, ㄢ, ㄣ, ㄤ, ㄥ, ㄨ}
   Second-Stage Vowel Subset
   B={ㄚ, ㄛ, ㄞ, ㄟ, ㄢ, ㄣ, ㄤ, ㄥ|(if A=ㄨ)}
Phonetic-symbol combination rules:
[ㄎ, ㄓ, ㄔ]+[A]+(if A=ㄨ) [B]
[ㄍ, ㄏ]+[A+ㄟ]+(if A=ㄨ) [B]
[ㄕ]+[A]+(if A=ㄨ) [B-ㄥ]
Note: ㄓ, ㄔ, ㄕ can be alone without a following vowel.
1-4. Consonant Subset {ㄖ, ㄗ, ㄘ, ㄙ}
Let
   First-Stage Vowel Subset
   A={ㄚ, ㄛ, ㄞ, ㄠ, ㄡ, ㄢ, ㄣ, ㄤ, ㄥ, ㄨ}
   Second-Stage Vowel Subset
   B={ㄛ, ㄟ, ㄢ, ㄣ, ㄥ|(if A=ㄨ)}
Phonetic-symbol combination rules:
[ㄖ]+[A-ㄚ-ㄠ]+(if A=ㄨ) [B]
[ㄗ]+[A+ㄟ]+(if A=ㄨ) [B]
[ㄘ, ㄙ]+[A]+(if A=ㄨ) [B]
Note: This consonant subset can be used alone without a following vowel.
1-5. Consonant Subset {ㄐ, ㄑ, ㄒ}
Let
   First-Stage Vowel Subset
   A={ㄧ, ㄩ}
   Second-Stage Vowel Subsets
   B1={ㄚ, ㄝ, ㄠ, ㄡ, ㄢ, ㄣ, ㄤ, ㄥ|(if A=ㄧ)}
   B2={ㄝ, ㄢ, ㄣ, ㄥ|(if A=ㄩ)}
Phonetic-symbol combination rules: [ㄐ, ㄑ, ㄒ]+[A]+(if A=ㄧ) [B1]
Or
[ㄐ, ㄑ, ㄒ]+[A]+(if A=ㄩ) [B2]
1-6. Consonant Subsets {ㄈ}
Let
   First-Stage Vowel Subset
   A={ㄚ, ㄛ, ㄟ, ㄠ, ㄡ, ㄢ, ㄣ, ㄤ, ㄥ, ㄨ}
Phonetic-symbol combination rules:
1-7. Zero-Consonant {0}
Let
   First-Stage Vowel Subset
   A={ㄚ, ㄛ, ㄜ, ㄝ, ㄞ, ㄟ, ㄠ, ㄡ, ㄢ, ㄥ, ㄦ, ㄧ, ㄨ, ㄩ}
   Second-Stage Vowel Subsets
   B1={ㄚ, ㄝ, ㄠ, ㄡ, ㄢ, ㄣ, ㄤ, ㄥ|(if A=ㄧ)}
   B2={ㄚ, ㄛ, ㄞ, ㄟ, ㄢ, ㄣ, ㄤ, ㄥ (if A=ㄨ)}
   B3={ㄝ, ㄢ, ㄣ, ㄥ|(if A=ㄩ)}
Phonetic-symbol combination rules:
[A]+(if A=ㄧ) [B1]
Or
[A]+(if A=ㄨ) [B2]
Or
[A]+(if A=ㄩ) [B3]

In accordance with the foregoing Mandarin Phonetic-Symbol Combination Rules, the invention provides a plurality of virtual keyboard, which are arranged m Pour retational layers: a first-layer virtual-keyboard set, a second-layer virtual-keyboard set, a third-layer virtual-keyboard set, and a fourth-layer virtual-keyboard set.

The first-layer virtual-keyboard set is used collectively to display the phonetic symbols in the Mandarin Phonetic Symbol Set that are permissible to be used as the first phonetic symbol in any phonetic-symbol combinations, eliminating those that will be used unexceptionally as the second or third phonetic symbols.

The second-layer virtual-keyboard set is used collectively to display the phonetic symbols in the Mandarin Phonetic Symbol Set that are permissible to be used as the second phonetic symbol in any phonetic-symbol combinations and that are related in accordance with the Mandarin Phonetic-Symbol Combination Rules to the firstly-selected phonetic symbol from the first-layer virtual-keyboard set. Accordingly, when the first phonetic symbol is selected by the user, the LCD of the mobile-phone handset will promptly display the virtual keyboard that is related to the firstly-selected phonetic symbol; and the displayed virtual keyboard only gives all the possible phonetic symbols that can follow behind the firstly-selected one.

The third-layer virtual-keyboard set is used collectively to display the phonetic symbols in the Mandarin Phonetic Symbol Set that are permissible to be used as the third phonetic symbol in any phonetic-symbol combinations and that are related in accordance with the Mandarin Phonetic-Symbol Combination Rules to the secondly-selected phonetic symbol from the second-layer virtual-keyboard set. Accordingly, when the second phonetic symbol is selected by the user, the LCD of the mobile-phone handset will promptly display the virtual keyboard that is related to the secondly-selected phonetic symbol; and the displayed virtual keyboard only gives all the possible phonetic symbols that can follow behind the secondly-selected one.

The fourth-layer virtual-keyboard set includes only one virtual keyboard used to display all the phonetic symbols representative of the 5 tones of Chinese characters, and which is displayed only when the thirdly-selected phonetic symbol from the third-layer virtual-keyboard set is a non-tone symbol.

Only one of these virtual keyboards can appear on the LCD at a time, and each of these virtual keyboards includes 12 virtual keys mapped in one-to-one correspondence to the 12 physical keys on the CCITT-compliant keyboard. When activated, the LCD will display one of the virtual keyboards in the first layer, and the user can selectively switch between the virtual keyboards in the first layer. After one phonetic symbol is selected from the first-layer virtual-keyboard set, all the subsequent virtual keyboards will appear automatically in accordance with the relations in the Mandarin Phonetic-Symbol Combination Rules. One example of the four layers of virtual keyboards are given below.

1) First-Layer Virtual-Keyboard set

| ㄅ | ㄆ | ㄇ | ㄐ | ㄑ | ㄒ | ㄚ | ㄛ | ㄟ |
| ㄈ | ㄉ | ㄊ | ㄓ | ㄔ | ㄕ | ㄜ | ㄞ | ㄦ |
| ㄋ | ㄌ | ㄍ | ㄔ | ㄖ | ㄕ | ㄠ | ㄥ | |
| VK | ㄎ | ㄏ | ㄗ | ㄘ | ㄙ | SP | A/a | |
| | Page 1 | | ㄧ | ㄨ | ㄩ | VK | Num | Sym |
| | | | VK | ㄖ | ㄝ | | Page 3 | |
| | | | | Page 2 | | | | |

Note: When initially activated, the LCD will display the Page 1 virtual keyboard, and the user can use the [VK] key to switch between Page 1, Page 2, and Page 3.

(2) Second-Layer Virtual-Keyboard Set

| | | |
|---|---|---|
| ㄚ | ㄜ | ㄛ |
| ㄞ | ㄟ | ㄠ |
| ㄡ | ㄢ | ㄣ |
| | ㄤ | ㄥ |
| ㄧ | ㄨ | ㄩ |
| 1 5 4 | 2 | 3 |

| | | |
|---|---|---|
| ㄚ | ㄜ | |
| ㄞ | ㄢ | ㄣ | (Note: This virtual keyboard is related to ㄓ, ㄔ, ㄕ, |
| | | ㄖ, ㄗ, ㄘ, |
| | ㄤ | ㄥ | and ㄙ in the First-Layer Virtual Keyboard Set). |
| ㄠ | ㄨ | ㄨ |
| 1 5 4 | 2 | 3 |
| | ㄧ | ㄩ | (Note: This virtual keyboard is related to ㄐ/ㄅ, ㄑ/ㄆ, |
| | | and ㄒ/ㄇ in the First-Layer Virtual Keyboard Set. |

(3) Third-Layer Virtual-Keyboard Set

| | | |
|---|---|---|
| 1 5 4 | 2 | 3 |
| | ㄚ | ㄝ |
| ㄠ | ㄢ | ㄣ | (Note: This virtual keyboard is related to ㄜ in the Second-Layer |
| | ㄤ | ㄥ | Virtual Keyboard Set.) |
| ㄡ | ㄛ | ㄟ |
| 1 5 4 | 2 | 3 |
| | ㄚ | |
| ㄝ | ㄢ | ㄣ | (Note: This virtual keyboard is related to ㄨ and |
| | | ㄩ in the Second- |
| | ㄤ | ㄥ | Layer Virtual Keyboard Set.) |
| ㄛ | ㄟ | ㄞ |

(4) Fourth-Layer Virtual-Keyboard Set 1 2 3
5
4

The above-listed four layers of virtual keyboards each contain a total of 12 virtual keys mapped in one-to-one correspondence to the 12 physical keys on the CCITT-compliant keyboard, and each virtual key can be activated by pressing on the corresponding physical key on the CCITT-compliant keyboard.

For example, the First-Layer Virtual-Keyboard Set provides the following three virtual keyboards, respectively labeled with Page 1, Page 2, and Page 3:

| | | | | | | | | |
|---|---|---|---|---|---|---|---|---|
| ㄅ | ㄆ | ㄇ | ㄐ | ㄑ | ㄒ | ㄚ | ㄛ | ㄟ |
| ㄈ | ㄉ | ㄊ | ㄓ | ㄔ | ㄕ | ㄜ | ㄣ | |
| ㄋ | ㄌ | ㄍ | ㄖ | ㄗ | ㄘ | ㄝ | ㄥ | ㄦ |
| VK | ㄎ | ㄏ | ㄗ | ㄘ | ㄙ | SP | A/a | |
| | Page 1 | | | ㄧ | ㄨ | VK | Num | Sym |
| | | | | VK | ㄩ | ㄜ | Page 3 | |
| | | | | | Page 2 | | | |

The first virtual keyboard Page 1 provides a total of 12 virtual keys: ㄅ, ㄆ, ㄇ, ㄈ, ㄉ, ㄊ, ㄋ, ㄌ, ㄍ, VK, ㄎ; which are mapped in one-to-one correspondence to the 1, 2ABC, 3DEF, 4GHI, 5JKL, 6MNO, 7PQR, 8TUV, 9WXY, *, 0, # keys on the CCITT-compliant keyboard, and wherein the VK key is used for switching between Page 1, Page 2, and Page 3.

The second virtual keyboard Page 2 provides a total of 12 virtual keys ㄐ/ㄅ, ㄑ/ㄆ, ㄒ/ㄇ, ㄓ/ㄆ, ㄔ/ㄣ, ㄕ/ㄥ, ㄧ, ㄨ, ㄩ, VK, ㄛ, ㄜ; which are mapped in one-to-one correspondence to the 1, 2ABC, 3DEF, 4GHI, 5JKL, 6MNO, 7PQR, 8TUV, 9WXY, *, 0, # keys on the CCITT-compliant keyboard, and wherein the VK key is used for switching between Page 1, Page 2, and Page 3.

The third virtual keyboard Page 3 provides a total of 12 virtual keys: ㄚ, ㄜ, ㄟ, ㄞ/ㄠ, ㄣ/ㄥ, ㄦ, SP, A/a, □, VK, Num, Sym; which are mapped in one-to-one correspondence to the 1, 2ABC, 3DEF, 4GHI, 5JKL, 6MNO, 7PQR, 8TUV, 9WXY, *, 0, and # keys on the CCITT-compliant keyboard, and wherein the VK key is used for switching between Page 1, Page 2, and Page 3.

From the Mandarin Phonetic-Symbol Combination Rules, it can be learned that the consonants [ㄐ, ㄑ, ㄒ] are each unexceptionally followed by a vowel; and the vowels [ㄞ, ㄠ, ㄡ] are unexceptionally unfollowed by another vowel, i.e., the vowels [ㄞ, ㄠ, ㄣ] are always the last one in any phonetic-symbol combinations. Accordingly, in the second virtual keyboard Page 2, [ㄐ, ㄞ, ] [ㄑ, ㄠ], and [ㄒ, ㄡ] are assigned together to the same virtual keys. Moreover, two different-consonants that sound closely alike, such as [ㄓ, ㄆ, ㄔ, ㄣ] and [ㄕ, ㄥ], are also assigned to the same virtual keys, allowing users who are unable to distinguish them not to make input mistakes.

As a demonstrative example, when the user wants to input the Chinese character "票" whose phonetic-symbol combination is ㄆㄧㄠ") to his/her mobile-phone hand-set the input operation includes the following steps:

(Step 1)

Since the first phonetic symbol is "ㄆ" the user needs to switch the First-Layer Virtual-Keyboard Set to Page 1, and then press the physical key 2ABC on the CCITT-compliant keyboard. This action inputs "ㄆ" to the mobile-phone handset.

(Step 2)

After the action of Step 1 is completed, the virtual keyboard in the Second-Layer Virtual-Keyboard Set that is related to "ㄆ" is automatically and promptly displayed on the LCD, as illustrated below:

| | | |
|---|---|---|
| ㄚ | ㄜ | ㄛ |
| ㄞ | ㄟ | ㄠ |
| ㄡ | ㄢ | ㄣ |
| | ㄤ | ㄥ |
| ㄧ | ㄨ | ㄩ |

At this time, the user needs just to press the * key on the CCITT-compliant keyboard to input the next phonetic symbol, i.e., "ㄧ" to the mobile-phone handset.

(Step 3)

After the action of Step 2 is completed, the virtual keyboard in the Third-Layer Virtual-Keyboard Set that is related to "ㄧ" is automatically and promptly displayed on the LCD, as illustrated below

| 1 5 4 | 2 | 3 |
|---|---|---|
|  | ㄚ | ㄝ |
| ㄠ | ㄢ | ㄣ |
|  | ㄤ | ㄥ |
| ㄡ | ㄛ | ㄟ |

At this time, the user needs just to press the [7PQR] key on the CCITT-compliant keyboard to input the next phonetic symbol, i.e., ㄠ to the mobile-phone handset.
(Step 4)

After the action of Step 3 is completed, the only virtual keyboard in the Fourth-Layer Virtual-Keyboard Set, which displays the phonetic symbols for tones, is automatically and promptly displayed on the LCD, as illustrated below:

| 1 5 4 | 2 | 3 |
|---|---|---|
| ˇ | ˊ | ˋ |

At this time, the user needs just to press the [4GHI] key on the CCITT-compliant keyboard to input the fourth tone to the mobile-phone handset.
(Step 5)

After the action of Step 4 is completed, the LCD promptly displays all the Chinese characters that are pronounced as "ㄆㄧㄠˋ", as illustrated below.

| 票 | 漂 | 飄 |
|---|---|---|
| 嫖 | 剽 | 嘌 |
| 僄 | 螵 | 瞟 |
| 慓 | 篻 | 顠 |

At this time, the user needs just to press the [1] key on the CCITT-compliant keyboard to select the intended Chinese character "票". This completes the input of the Chinese character "票" to the mobile-phone handset. Subsequent characters can be inputted in the same manner.

Figures 3, 4:
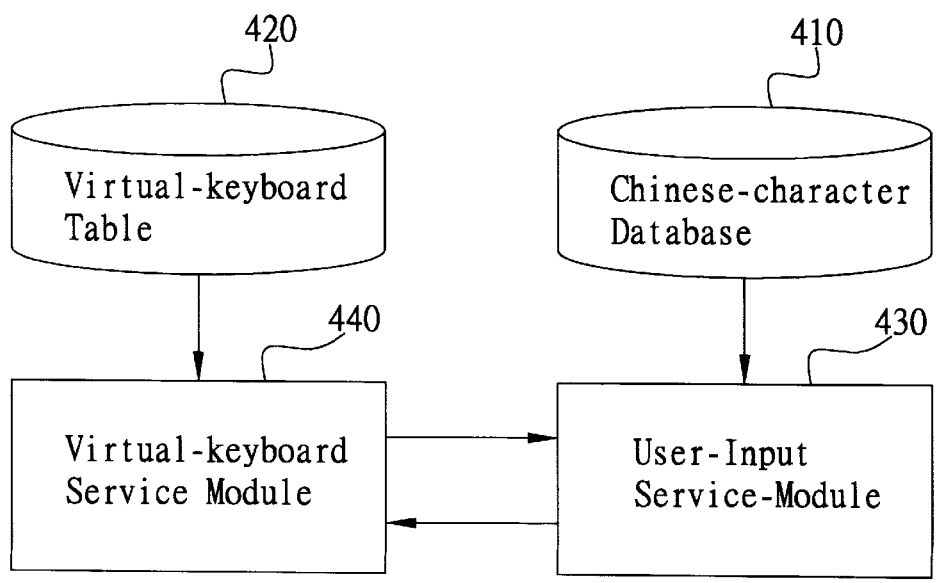
FIG. 3 is a table showing the mapping between virtual keyboards and phonetic symbols displayed on the virtual keyboards.
FIG. 4 is a schematic block diagram showing the system architecture of the invention when implemented through software.

FIG. 3 is a table showing the mapping between the virtual keyboards and the phonetic symbols displayed on the virtual keyboards. As shown, each layer of virtual keyboards includes a plurality of phonetic symbols, each of which is assigned to a unique key value. The linking between a phonetic symbol in a layer and its related virtual keyboard in the next layer is predefined in accordance with the above-mentioned Mandarin Phonetic-Symbol Combination Rules.

FIG. 4 is a schematic diagram showing the system architecture of the invention when implemented through software. As shown, the software architecture implementing the invention includes a Chinese-character database 410, a virtual-keyboard table 420, a user-input service module 430, and a virtual-keyboard service module 440. The Chinese-character database 410 is used to store a set of Chinese characters and the mapping between each Chinese character and its phonetic-symbol combination based on the Mandarin Phonetic Symbol Set. The virtual-keyboard table 420 is used to store the above-mentioned four layers of virtual keyboards. The user-input service module 430 is coupled to the CCITT-compliant keyboard of the mobile phone handset and is used for keycode reception from the physical keys on the CCITT-compliant keyboard. The virtual-keyboard service module 440 is used to retrieve, in response to each keycode input from the CCITT-compliant keyboard, the activated virtual keyboard from the virtual-keyboard table 420.

Figure 5:
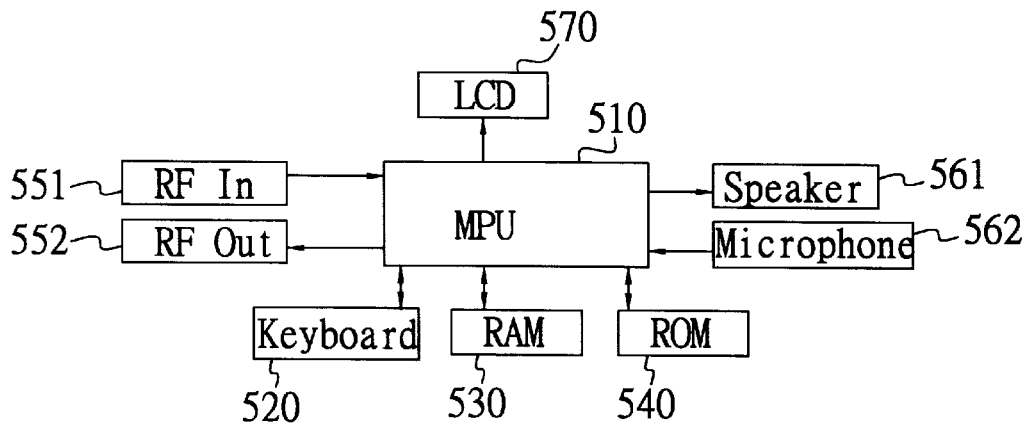
FIG. 5 is a schematic block diagram showing the hardware architecture of the mobile-phone handset on which the invention is implemented.

FIG. 5 is a schematic diagram showing the hardware architecture of the mobile-phone handset on which the invention is implemented. As shown, the hardware architecture includes a microprocessor unit (MPU) 510, a CCITT-compliant keyboard 520 (i.e., the CCITT-compliant keyboard 210 shown in FIG. 2), a RAM (random-access unit) 530, a ROM (read-only memory) 540, a radio-frequency input (RF In) unit 551, a radio-frequency output (RF Out) unit 552, a loudspeaker 561, a microphone 562, and an LCD (i.e., the LCD 230 shown in FIG. 2). This architecture is conventional and not within the scope and spirit of the invention, so description thereof will not be further detailed. The Chinese-character database 410, the virtual-keyboard table 420, the user-input service module 430, and the virtual-keyboard service module 440 shown in FIG. 4 can be implemented as software and/or firmware stored in the RAM unit 530 and/or the ROM unit 540.

Figure 6:
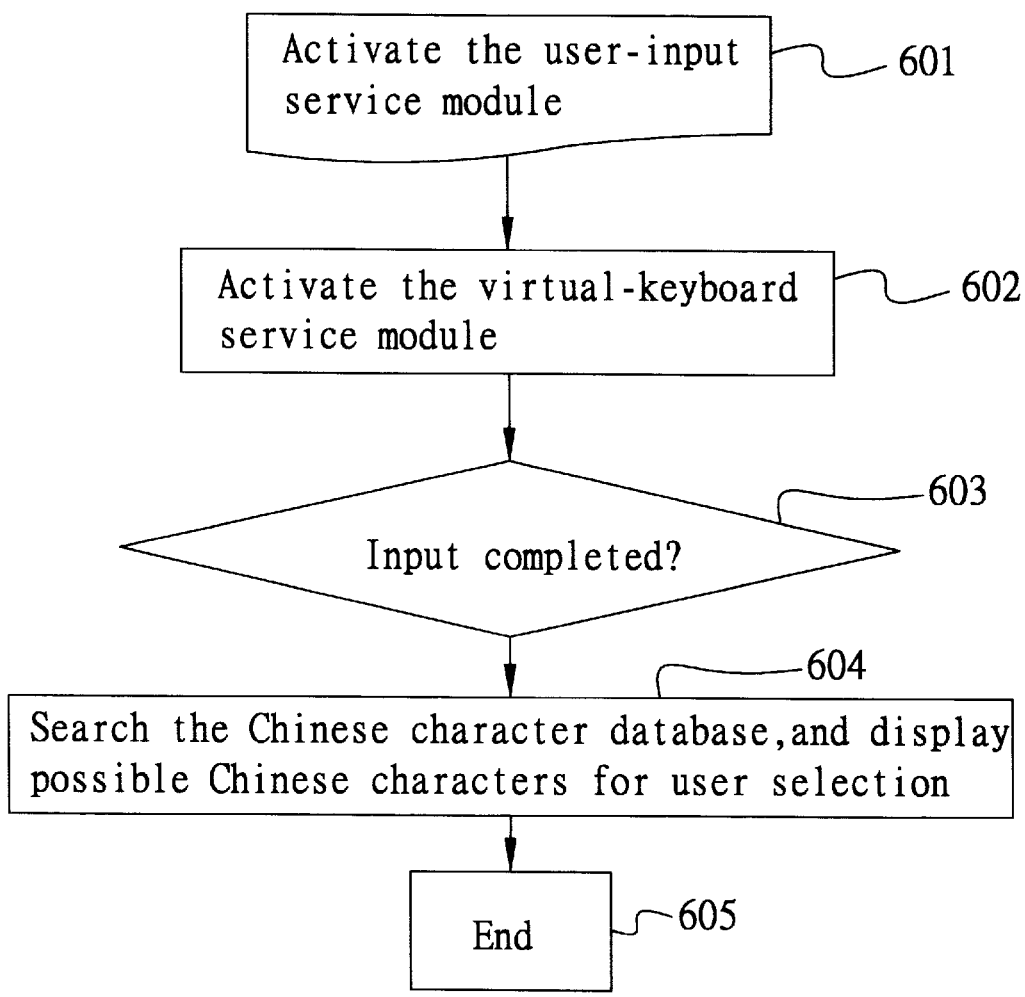
FIG. 6 is a flow diagram showing the main procedural steps involved in the Chinese-character input method of the invention.

FIG. 6 is a flow diagram showing the main procedural steps involved in the method of the invention for Chinese-character input to the mobile-phone handset.

As shown, in the step 601, the Chinese-character database 410 is activated to receive input keycode from the CCITT-compliant keyboard.

In the next step 602, if a keycode is received, the virtual-keyboard table 420 ia activated to display the Page 1 virtual keyboard in the first layer. If the "VK" key is pressed, the active virtual keyboard is switched to the next one. When the user selects the first phonetic symbol from the first-layer virtual-keyboard set, the related virtual keyboard in the next layer will be retrieved and displayed for user selection.

In the next step 603, it is checked that whether a complete phonetic-symbol combination has been received. If YES, the procedure goes to the step 604.

In the step 604, the Chinese character database 410 is searched to find the Chinese characters corresponding to the inputted phonetic-symbol combination. These Chinese characters are then displayed on the LED for user selection. The procedure is then ended.

Figure 7:
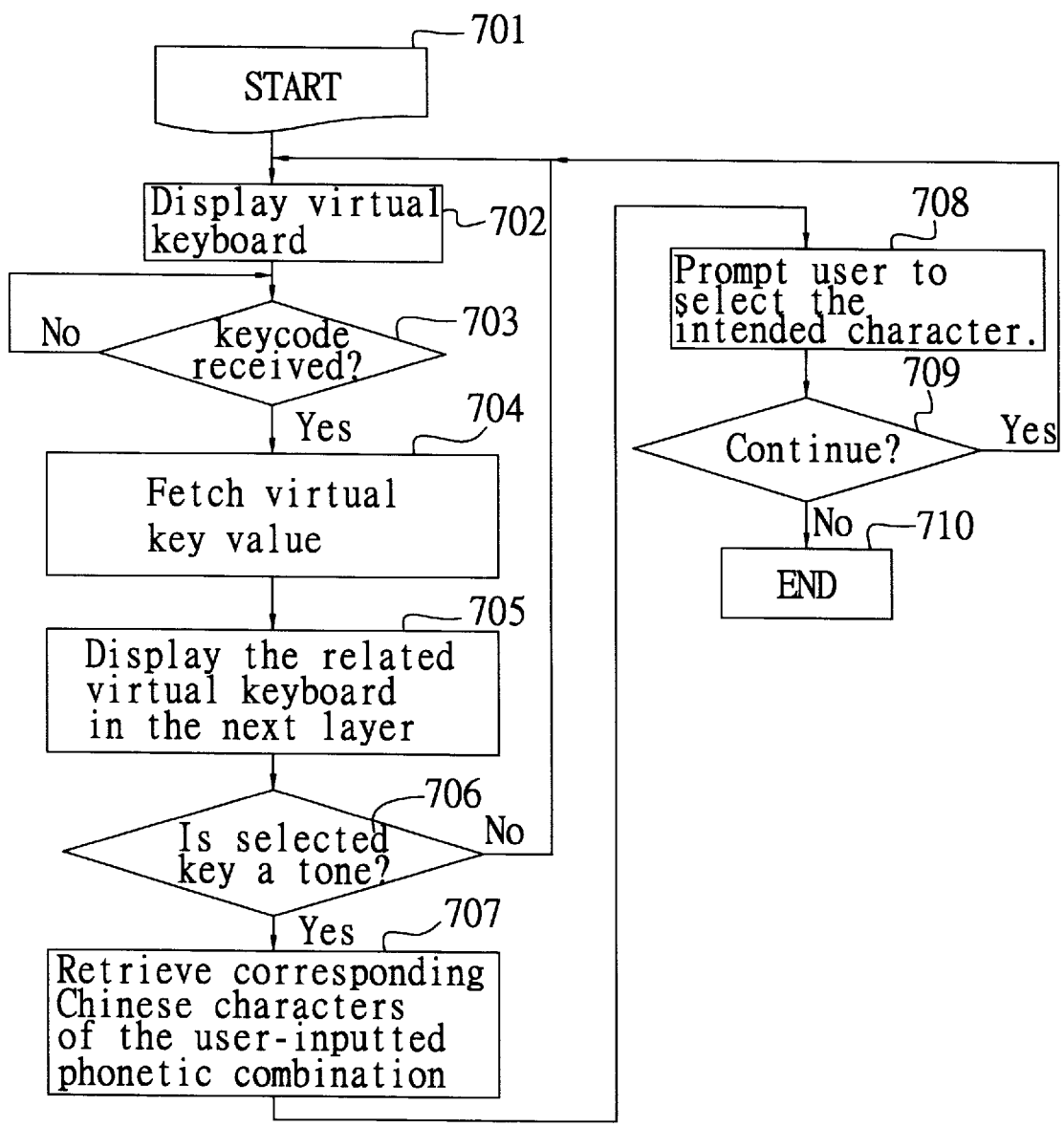
FIG. 7 is a flow diagram showing more detailed procedural steps involved in the Chinese-character input method of the invention.

FIG. 7 is a flow diagram showing detailed procedural steps involved in the method of the invention for input Chinese characters to the mobile-phone handset.

As shown, in the first step 701, the system activates the Chinese-character input function in response to user request.

In the next step 702, the Page 1 virtual keyboard in the first-layer virtual-keyboard set is displayed on the LCD 230.

In the next step 703, the system checks that whether a virtual key representing a phonetic symbol is selected. If NO, the step 703 is repeated; otherwise, if YES, the procedure goes to the step 704.

In the step 704, the system fetches the keycode of the activated virtual key on the currently displayed virtual keyboard. The procedure then goes the step 705.

In the step 705, the system retrieves the virtual keyboard in the next layer that is related to the firstly-selected phonetic symbol in the step 703.

In the next 706, the system checks whether the selected phonetic symbol in the step 705 is a tone. If NOT, the procedure goes back to the step 702 to display the virtual keyboard in the next layer retrieved in the step 705; otherwise, if YES, the procedure goes to the step 707.

In the step 707, the system retrieves the Chinese characters corresponding to the inputted phonetic-symbol combination. The procedure then goes to the step 708.

In the step 708, the system displays the retrieved Chinese characters on the LCD 230 for user selection. After the user selects the intended Chinese character, the procedure then goes to the step 709.

In the step 709, the system displays a message asking the user whether the input procedure is to be continued to input another Chinese character. If the user inputs YES, the procedure goes back to the step 702; otherwise, if NO, the procedure is ended.

2. Preferred Embodiment with the Roman Symbol Set

The pronunciations of Chinese characters can also be represented by using Roman symbols. These Roman symbols are collectively referred to as Roman Symbol Set. Similar to the use of Mandarin Phonetic Symbol Set, the Chinese-character pronunciations based on the Roman Symbol Set can be represented by the following relationship:

[Pronunciation]=[Consonant]+[First-Stage Vowel]+[Second-Stage Vowel]+[Tone]

Through induction, it can be found that there exist many regularities in the Roman-symbol combinations representing the pronunciations of Chinese characters. For instance, all the second-stage vowels come into existence only when the first-stage vowel is either of [i,u,v].

Moreover, the consonants [j,q,x] combine with vowels in accordance with the following rule:

[Pronunciation]=[j,q,x]+[i,v]+[Second-Stage Vowel]

which implies that when either of [j,q,x] is the first Roman symbol in any phonetic-symbol combinations, then the next Roman symbol will be unexceptionally either of [i,v].

It is an important aspect of the invention to use the above-mentioned regularities in the Roman-symbol combinations for Chinese-character pronunciations to help enhance the input speed by the user.

The regularities in the Roman-symbol combinations are summarized in the following and are herein and hereinafter collectively referred to as "Chinese Roman-Symbol Combination Rules" throughout this specification.

Fundamentally, consonants combine with first-stage and second-stage vowels in accordance with the following rules:

[Pronunciation]=[Consonant]+[First-Stage Vowel±Exceptional Vowels]+[Second-Stage Vowel±Exceptional Vowels]

The consonants in the Roman Symbol Set can be divided into the following 7 subsets:

Consonant Subset 1={b'p'm}
Consonant Subset 2={d't'n'l}
Consonant Subset 3={g'k'h'zh'ch'sh}
Consonant Subset 4={r'z'c's}
Consonant Subset 5={j'q'x}
Consonant Subset 6={f}
Consonant Subset 7 ={0} where {0{ represents Zero-Consonant)

The consonants in these subsets combine with vowels in different ways, as respectively given in the following.

2-1. Consonant Subset (b'p'm}
Let
  First-Stage Vowel Subset
  A={a'o'ai'ei'ao'ou'an'en'ang'eng'i'u}
  Second-Stage Vowel Subset
  B={e'ao'an'n'ng|(ifA=i)}
  Roman-symbol combination rules:
  [b]+[A–ou]+(if A=i) [B]
  [p]+[A]+(if A=i) [B]
  [m]+[A+e]+(if A=i) [B+u]

2-2. Consonant Subset {d't'n'l}
Let
  First-Stage Vowel Subset
  A={a'e'ai'ao'ou'an'ang'eng'ong'i'u'v}
  Second-Stage Vowel Subset
  B1={e'ao'u'an'ng|(if A=i)}
  B2={o'an'n|(if A=u)}
  B3={e|(if A=v)}
Roman-symbol combination rules:
  [ ]+[A–v]+(if A=i) [B1]
Or
  [d]+[A–v]+(if A=u) [B2+i]
  [t]+[A–v]+(if A=i) [B1–u]
Or
  [t]+[A–v]+(if A=u) [B2+i]
  [n]+[A+ei+en]+(if A=i) [B+n+ng]
Or
  [n]+[A+ei+en]+(if A=u) [B2–n]
Or
  [n]+[A+ei+en]+(if A=v) [B3]
  [l]+[A+ei]+(if A=i) [B1+n+ng]
Or
  [l]+[A+ei]+(if A=u) [B2]
Or
  [l]+[A+ei]+(if A=v) [B3]

2-3. Consonant Subset {g'k'h'zh'ch'sh}
Let
  First-Stage Vowel Subset
  A={a'e'ai'ao'ou'an'en'ang'eng'ong'u}
  Second-Stage Vowel Subset
  B={a'o'ai'i'an'n'ng|(if A=u)}
  Roman-symbol combination rules:
  $[_k]$+[A]+(if A=u) [B]
  [zh'ch]+[A+i]+(if A=u) [B]
  [g'h]+[A+ei]+(if A=u) [B]
  [sh]+[A+i–ong]+(if A=u) [B]

2-4. Consonant Subset {r'z'c's}
Let
  First-Stage Vowel Subset
  A={a'e'i'u'ai'ao'ou'an'en'ang'eng'ong}
  Second-Stage Vowel Subset
  B=o'i'an'n|(if A=u)}
  Roman-symbol combination rules:
  [r]+[A–a–ai]+(if A=u) [B3]
  [z]+[A+ei]+(if A=u) [B]
  [c's]+[A]+(if A=u) [B]

2-5. Consonant Subset {i'q'x}
Let
  First-Stage Vowel Subset
  A={i'v}
  Second-Stage Vowel Subset
  B1={a'e'ao'u'an'n'ang'ng'ong|(if A=i)}
  B2={e'an'n|(if A=v)}
  Roman-symbol combination rules:
  [j'q'x]+[A]+(if A=i) [B]
Or
  [j'q'x]+[A]+(if A=v) [B2]

2-6. Consonant Subset {f}
Let

First-Stage Vowel Subset
A={a'o'ei'ou'an'en'ang'eng'u}
Roman-symbol combination rules:
[f]+[A]
2-7. Zero-Consonant {0}
Let
First-Stage Vowel Subset
A={a'o'ai'ei'ao'ou'an'en'ang'eng'er'y'w}
Second-Stage Vowel Subset
B1={i'a'e'ao'ou'an'in'ang'ing'ong'ue'uan'un|(if A=y)}
B2={u'a'o'ai'ei'an'en'ang|(if A=w)}
Roman-symbol combination rules:
[A]+(if A=y) [B1]
Or
[A]+(if A=w) [B2]
Note: y and w can not be used alone.

In accordance with the foregoing Chinese Roman-Symbol Combination Rules, four layers of virtual keyboard sets are provided, as respectively given below:

(1) First-Layer Virtual-Keyboard Set

| b | p | m | j | q | x | a | o | ou |
|---|---|---|---|---|---|---|---|----|
| f | d | t | ai | ei | ao | an | en | er |
| n | l | g | zh | ch | sh | ang | eng | |
| VK | k | h | z | c | s | SP | A/a | |
| | Page 1 | | y | w | | VK | Num | Sym |
| | | | VK | r | e | | Page 3 | |
| | | | | Page 2 | | | | |

(2) Second-Layer Virtual-Keyboard Set

| a | e | i | |
|---|---|---|---|
| u | Ü | ai | |
| ei | ao | ou | |
| an | en | ong | |
| ang | eng | | |
| a | o | e | |
| ai | ei | ao | |
| ou | an | en | |
| | ang | eng | (Note: This virtual keyboard is related to [b]. [p]. [m]. |
| i | u | Ü | and [f] in the First-Layer Virtual Keyboard Set). |
| 1 | 2 | 3 | |
| 5 | | | |
| 4 | i | u | |
| | | | (Note: This virtual keyboard is related to [j/ai]. [q/ei]. and [x/ao] in the First-Layer Virtual Keyboard Set. |

(3) Third-Layer Virtual-Keyboard Set

| 1 | 2 | 3 | |
|---|---|---|---|
| 5 | | | |
| 4 | a | | |
| e | u | ao | (Note: Ths virtual keyboard is related to [i] in the Second-Layer Virtual Keyboard Set. |
| an | n | | |
| ang | ng | ong | |
| 1 | 2 | 3 | |
| 5 | | | |
| 4 | a | | |
| e | o | i | (Note: This virtual keyboard is related to [u] and [ü] in the Second-Layer Virtual Keyboard Set. |
| an | | | |
| ang | ai | n | |
| a | e | i | |
| u | ao | ou | |
| ue | uan | un | (Note: This virtual keyboard is related to [y] in the Seeond-Layer Virtual Keyboard Set. |
| an | in | ong | |
| ang | ing | | |

-continued

| a | u | o | |
|---|---|---|---|
| ai | ei | | |
| an | en | | (Note: This virtual keyboard is related to [w] in the Second-Layer Virtual Keyboard Set. |
| ang | eng | | |

(4) Fourth-Layer Virtual-Keyboard Set

| 1 | 2 | 3 |
|---|---|---|
| 5 | | |
| 4 | | |

From the Chinese Roman-Symbol Combination Rules, it can be learned that the consonants [j,q,z] are each unexceptionally followed by a vowel; and the vowels [ai,ei,ao] are unexceptionally unfollowed by another vowel, i.e., these vowels [ai,ei,ao] are unexceptionally the last one in any Romanization combinations. Accordingly, in the second virtual keyboard Page 2, the [j,ai], [q, ei], and [z,ao] are assigned together to the same keys. Moreover, two different consonants that sound closely alike, such as [zh,z], [ch,c], and [sh,s], are also assigned to the same keys, allowing users who are unable to clearly distinguish them to make less input mistakes.

As a demonstrative example, when the user wants to input the Chinese character 票 (whose Romanized pronunciation is "piao4") to his/her mobile-phone handset, the input operation includes the following steps:

(Step 1)
Since the first Roman symbol is "p", the user needs to switch the First-Layer Virtual-Keyboard Set to Pace 1, and then press the physical key [2ABC] on the CCITT-compliant keyboard. This action inputs "p" to the mobile-phone handset.

(Step 2)
After the action of Step 1 is completed, the virtual keyboard in the Second-Layer Virtual-Keyboard Set that is related to "p" is promptly displayed on the LCD, as illustrated below:

| a | o | e |
|---|---|---|
| ai | ei | ao |
| ou | an | en |
| | ang | eng |
| | u | Ü |

At this time, the user needs just to press the [*] key on the CCITT-compliant keyboard to input the next Roman symbol, i.e., "i" to the mobile-phone handset.

(Step 3)
After the action of Step 2 is completed, the virtual keyboard in the Third-Layer Virtual-Keyboard Set that is related to "i" is promptly displayed on the LCD, as illustrated below:

| 1 | 2 | 3 |
|---|---|---|
| 5 | | |
| 4 | a | |
| e | u | ao |
| an | n | ong |
| ang | ng | |

At this time, the user needs just to press the [7PQR] key on the CCITT-compliant keyboard to input the next Roman symbol, i.e., "ao", to the mobile-phone handset.

(Step 4)

After the action of Step 3 is completed, the only virtual keyboard in the Fourth-Layer Virtual-Keyboard Set, which displays tonal symbols only, is promptly displayed on the LCD, as illustrated below:

| 1 | 2 | 3 |
|---|---|---|
| 5 |   |   |
| 4 |   |   |

At this time, the user needs just to press the 4GHI key on the CCITT-compliant keyboard to assign the previously-input Romanization combination "piao" to the fourth tone.

(Step 5)

After the action of Step 4 is completed, the LCD promptly displays all the Chinese characters that are pronounced as "piao4", as illustrated below.

| 票 | 漂 | 醥 |
|---|---|---|
| 嫖 | 剽 | 瞟 |
| 僄 | 影 | 菜 |
| 慓 | 篻 | 飄 |

At this time, the user needs just to press the 1 key on the CCITT-compliant keyboard to input the intended Chinese characters to the mobile-phone handset.

CONCLUSION

The invention provides a Chinese-character input method and system that allows the user to perform the task of Chinese-character input to a data processor with a reduced keyboard, such as a mobile-phone handset with a CCITT-compliant keyboard having 12 physical keys. The invention allows the user to input Chinese characters through a plurality of virtual keyboards which collectively displays the symbols in the Mandarin Phonetic Symbol Set or the Roman Symbol Set. These virtual keyboards are arranged in relational layers in accordance with the Mandarin Phonetic-Symbol Combination Rules or the Chinese Roman-Symbol Combination Rules, so that the user can perform the task of Chinese-character input to the data processor more conveniently and efficiently than the prior art.

The invention has been described using exemplary preferred embodiments. However, it is to be under stood that the scope of the invention is not limite d to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A Chinese-character input method for use on a data processor having a display screen and a keyboard, for the purpose of allowing user-input of Chinese characters to the data processor through the keyboard;

the Chinese-character input method comprising the steps of:

(1) establishing a Chinese-character database, which stores a set of Chinese characters and the mapping between each Chinese character and its phonetic-symbol combination based on a selected phonetic-symbol set;

(2) establishing a virtual-keyboard table, which includes a plurality of virtual keyboards arranged in relational layers in accordance with a phonetic-symbol combination rule of the selected phonetic-symbol set, each virtual keyboard including a number of virtual keys mapped in one-to-one correspondence to the physical keys on the keyboard of the data processor, the plurality of virtual keyboards collectively displaying all the phonetic symbols in the selected phonetic-symbol set, with each virtual keyboard displaying a specified part of the phonetic-symbol set;

(3) when inputting a Chinese character having a specific phonetic-symbol combination is requested, displaying one of the plurality of virtual keyboards in a first layer that includes a first phonetic symbol in the phonetic-symbol combination for the intended Chinese character for user selection;

(4) displaying one of the plurality of virtual keyboards in a second layer that includes a second phonetic symbol in the phonetic-symbol combination for the intended Chinese character, if the second phonetic-symbol is a non-tone symbol; or otherwise going to step (6) if not;

(5) displaying one of the plurality of virtual keyboards in a third layer that includes a third phonetic symbol in the phonetic-symbol combination for the intended Chinese character, if the third phonetic-symbol is a non-tone symbol; or otherwise going to step (6), if not;

(6) displaying one of the plurality of virtual keyboards in a fourth layer that includes a fourth phonetic symbol, which is subject to a tone symbol in the phonetic-symbol combination for the intended Chinese character; and (7) in response to the phonetic-symbol combination obtained through the steps (3) to (6), retrieving, from the Chinese-character database, a set of Chinese characters corresponding to the user-inputted phonetic-symbol combination; and displaying this set of Chinese characters on the display screen for user selection of the intended Chinese character.

2. The Chinese-character input method of claim 1, wherein the data processor is a mobile-phone handset.

3. The Chinese-character input method of claim 2, wherein the keyboard is a CCITT-compliant keyboard having a total of 12 physical keys.

4. The Chinese-character input method of claim 3, wherein the virtual keyboards each have a total of 12 virtual keys mapped in one-to-one correspondence to the 12 physical keys on the CCITT-compliant keyboard.

5. The Chinese-character input method of claim 1, wherein the phonetic-symbol set is the Mandarin Phonetic Symbol Set.

6. The Chinese-character input method of claim 5, wherein the plurality of virtual keyboards include:

(i) a first-layer virtual-keyboard set, which includes a number of virtual keyboards which are used collectively to display the phonetic symbols in the Mandarin Phonetic Symbol Set that are permissible lo be used as the first phonetic symbol in any phonetic-symbol combinations;

(ii) a second-layer virtual-keyboard set, which includes a number of virtual keyboards which are used collectively to display the phonetic symbols in the Mandarin Phonetic Symbol Set that are permissible to be used as the second phonetic symbol in any phonetic-symbol combinations and that are related in accordance with the Mandarin Phonetic-Symbol Combination Rules to the firstly-selected phonetic symbol from the first-layer virtual-keyboard set;

(iii) a third-layer virtual-keyboard set, which includes a number of virtual keyboards which are used collectively to display the phonetic symbols in the Mandarin Phonetic Symbol Set that are permissible to be used as the third phonetic symbol in any phonetic-symbol combinations and that are related in accordance with the Mandarin Phonetic-Symbol Combination Rules to the secondly-selected phonetic symbol from the second-layer virtual-keyboard set; and (iv) a fourth-layer virtual-keyboard set, which includes at least one virtual keyboard used to display the phonetic symbol representative of the 5 tones of Chinese characters, and which is displayed after the phonetic symbol selected from the third-layer virtual-keyboard set is a non-tone symbol.

7. The Chinese-character input method of claim 6, wherein the virtual keyboards in the first-layer virtual-keyboard set each include a switch key for user-activated switching between the virtual keyboards in the first-layer virtual-keyboard set.

8. The Chinese-character input method of claim 1, wherein the screen display is an LCD.

9. The Chinese-character input method of claim 1, wherein the phonetic-symbol set is the Roman Symbol Set.

10. The Chinese-character input method of claim 9, wherein the plurality of virtual keyboards include:

(i) a first-layer virtual-keyboard set, which includes a number of virtual keyboards which are used collectively to display the Roman symbols in the Roman Symbol Set that are permissible to be used as the first Roman symbol in any phonetic-symbol combinations;

(ii) a second-layer virtual-keyboard set, which includes a number of virtual keyboards which are used collectively to display the Roman symbols in the Roman Symbol Set that are permissible to be used as the second Roman symbol in any phonetic-symbol combinations and that are related in accordance with the Mandarin Phonetic-Symbol Combination Rules to the firstly-selected Roman symbol from the first-layer virtual-keyboard set;

(iii) a third-layer virtual-keyboard set, which includes a number of virtual keyboards which are used collectively to display the Roman symbols in the Roman Symbol Set that are permissible to be used as the third Roman symbol in any phonetic-symbol combinations and that are related in accordance with the Mandarin Phonetic-Symbol Combination Rules to the secondly-selected Roman symbol from the second-layer virtual-keyboard set; and (iv) a fourth-layer virtual-keyboard set, which includes at least one virtual keyboard used to display the Roman symbols representative of the 5 tones of Chinese characters, and which is displayed after the Roman symbol selected from the third-layer virtual-keyboard set is a non-tone symbol.

11. A Chinese-character input system for use on a data processor having a display screen and a keyboard including a number of physical keys thereon, for the purpose of allowing user-input of Chinese characters to the data processor through the keyboard;

the Chinese-character input system comprising:

(a) a Chinese-character database, which stores a set of Chinese characters and the mapping between each Chinese character and its phonetic-symbol combination based on the Mandarin Phonetic Symbol Set;

(b) a virtual-keyboard table, which includes a plurality of virtual keyboards arranged in relational layers in accordance with a phonetic-symbol combination rule of the selected phonetic-symbol set, each virtual keyboard including a number of virtual keys mapped in one-to-one correspondence to the physical keys on the keyboard of the data processor, the virtual keyboards collectively displaying all the phonetic symbols in the Mandarin Phonetic Symbol Set, with each virtual keyboard displaying a specified part of the Mandarin Phonetic Symbol Set;

(c) a user-input service module, coupled to the keyboard of the data processor, for keycode reception from the physical keys on the keyboard;

(d) a virtual-keyboard service module, which performs, in response to keycode input received by the user-input service module from the keyboard of the data processor, the steps of:

(d1) retrieving, from the virtual-keyboard table, one of the plurality of virtual keyboards in a first layer that includes a first phonetic symbol in the phonetic-symbol combination that represents the pronunciation of the intended Chinese character that is to be input to the data processor, and displaying the retrieved virtual keyboard on the display screen for user-selection of the required phonetic symbol;

(d2) retrieving, from the virtual-keyboard table, one of the plurality of virtual keyboards in a second that includes a second phonetic-symbol in the intended phonetic-symbol combination, if the second phonetic-symbol is a non-tone symbol and displaying the retrieved virtual keyboard on the display screen for user-selection of the required phonetic symbol; or otherwise going to step (d4), if not;

(d3) retrieving, from the virtual-keyboard table, one of the plurality of virtual keyboards in a third layer that includes a third phonetic symbol in the intended phonetic-symbol combination, if the third phonetic-symbol is a non-tone symbol, and displaying the retrieved virtual keyboard on the display screen for user-selection of the required phonetic symbol; or otherwise going to step (d4), if not;

(d4) retrieving, from the virtual-keyboard table, one of the plurality of virtual keyboards in a fourth layer that includes a fourth phonetic symbol for the tone of the intended Chinese character; and displaying the retrieved virtual keyboard on the display screen for user-selection of the required phonetic symbol; and (d5) in response to the phonetic-symbol combination obtained through steps (d1) to (d4), retrieving, from the Chinese-character database, a set of Chinese characters corresponding to the phonetic-symbol combination; and displaying this set of Chinese characters on the display screen for user-selection of the intended Chinese character.

12. The Chinese-character input system of claim 11, wherein the data processor is a mobile-phone handset.

13. The Chinese-character input system of claim 12, wherein the keyboard is a CCITT-compliant keyboard having a total of 12 physical keys.

14. The Chinese-character input system of claim 13, wherein the virtual keyboards each have a total of 12 virtual keys mapped in one-to-one correspondence to the 12 physical keys on the CCITT-compliant keyboard.

15. The Chinese-character input system of claim 11, wherein the plurality of virtual keyboards include:

(i) a first-layer virtual-keyboard set, which includes a number of virtual keyboards which are used collectively to display the phonetic symbols in the Mandarin Phonetic Symbol Set that are permissible to be used as the first phonetic symbol in any phonetic-symbol combinations;

(ii) a second-layer virtual-keyboard set, which includes a number of virtual keyboards which are used collectively to display the phonetic symbols in the Mandarin Phonetic Symbol Set that are permissible to be used as the second phonetic symbol in any phonetic-symbol combinations and that are related in accordance with the Mandarin Phonetic-Symbol Combination Rules to the firstly-selected phonetic symbol from the first-layer virtual-keyboard set;

(iii) a third-layer virtual-keyboard set, which includes a number of virtual keyboards which are used collectively to display the phonetic symbols in the Mandarin Phonetic Symbol Set that are permissible to be used as the third phonetic symbol in any phonetic-symbol combinations and that are related in accordance with the Mandarin Phonetic-Symbol Combination Rules to the secondly-selected phonetic symbol from the second-layer virtual-keyboard set; and (iv) a fourth-layer virtual-keyboard set, which includes at least one virtual keyboard used to display the phonetic symbol representative of the 5 tones of Chinese characters, and which is displayed after the phonetic symbol selected from the third-layer virtual-keyboard set is a non-tone symbol.

16. A Chinese-character input system for use on a data processor having a display screen and a keyboard including a number of physical keys thereon, for the purpose of allowing user-input of Chinese characters to the data processor through the keyboard;

the Chinese-character input system comprising:

(a) a Chinese-character database, which stores a set of Chinese characters and the mapping between each Chinese character and its phonetic-symbol combination based on the Roman Symbol Set;

(b) a virtual-keyboard table, which includes a plurality of virtual keyboards arranged in relational layers in accordance with a phonetic-symbol combination rule of the selected phonetic-symbol set, each virtual keyboard including a number of virtual keys mapped in one-to-one correspondence to the physical keys on the keyboard of the data processor, the virtual keyboards collectively displaying all the phonetic symbols in the roman symbols in the Roman Symbol Set, with each virtual keyboard displaying a specified part of the Roman Symbol Set;

(c) a user-input service module, coupled to the keyboard of the data processor, for keycode reception from the physical keys on the keyboard;

(d) a virtual-keyboard service module, which performs, in response to keycode input received by the user-input service module from the keyboard of the data processor, the steps of:

(d1) retrieving, from the virtual-keyboard table, one of the plurality of virtual keyboards in a first layer that includes a first Roman symbol in the phonetic-symbol combination that represents the pronunciation of the intended Chinese character that is to be input to the data processor, and displaying the retrieved virtual keyboard on the display screen for user-selection of the required Roman symbol;

(d2) retrieving, from the virtual-keyboard table, one of the plurality of virtual keyboards in a second that includes a second Roman-symbol in the intended phonetic-symbol combination, if the second phonetic-symbol is a non-tone symbol and displaying the retrieved virtual keyboard on the display screen for user-selection of the required Roman symbol; or otherwise going to step (d4), if not;

(d3) retrieving, from the virtual-keyboard table, one of the plurality of virtual keyboards in a third layer that includes a third Roman symbol in the intended phonetic-symbol combination, if the third phonetic-symbol is a non-tone symbol, and displaying the retrieved virtual keyboard on the display screen for user-selection of the required Roman symbol; or otherwise going to step (d4), if not;

(d4) retrieving, from the virtual-keyboard table, one of the plurality of virtual keyboards in a fourth layer that includes a fourth phonetic symbol for the tone of the intended Chinese character; and displaying the retrieved virtual keyboard on the display screen for user-selection of the required Roman symbol; and (d5) in response to the phonetic-symbol combination obtained through steps (d1) to (d4), retrieving, from the Chinese-character database, a set of Chinese characters corresponding to the phonetic-symbol combination; and displaying this set of Chinese characters on the display screen for user-selection of the intended Chinese character.

17. The Chinese-character input system of claim 16, wherein the data processor is a mobile-phone handset.

18. The Chinese-character input system of claim 17, wherein the keyboard is a CCITT-compliant keyboard having a total of 12 physical keys.

19. The Chinese-character input system of claim 18, wherein the virtual keyboards each have a total of 12 virtual keys mapped in one-to-one correspondence to the 12 physical keys on the CCITT-compliant keyboard.

20. The Chinese-character input system of claim 16, wherein the plurality of virtual keyboards include:

(i) a first-layer virtual-keyboard set, which includes a number of virtual keyboards which are used collectively to display the Roman symbols in the Roman Symbol Set that are permissible to be used as the first Roman symbol in any Roman-symbol combinations;

(ii) a second-layer virtual-keyboard set, which includes a number of virtual keyboards which are used collectively to display the Roman symbols in the Roman Symbol Set that are permissible to be used as the second Roman symbol in any Roman-symbol combinations and that are related in accordance with the Chinese Roman-Symbol Combination Rules to the firstly-selected Roman symbol from the first-layer virtual-keyboard set;

(iii) a third-layer virtual-keyboard set, which includes a number of virtual keyboards which are used collectively to display the Roman symbols in the Roman Symbol Set that are permissible to be used as the third Roman symbol in any Roman-symbol combinations and that are related in accordance with the Chinese Roman-Symbol Combination Rules to the secondly-selected Roman symbol from the second-layer virtual-keyboard set; and (iv) a fourth-layer virtual-keyboard set, which includes at least one virtual keyboard used to display the Roman symbol representative of the 5 tones of Chinese characters, and which is displayed after the Roman symbol selected from the third-layer virtual-keyboard set is a non-tone symbol.

* * * * *